United States Patent [19]
Larrabee

[11] 3,767,462
[45] Oct. 23, 1973

[54] METHOD FOR FABRICATION OF POLYCRYSTALLINE FILMS
[75] Inventor: Robert Dean Larrabee, Princeton, N.J.
[73] Assignee: RCA Corporation, New York, N.Y.
[22] Filed: Oct. 28, 1971
[21] Appl. No.: 193,541

[52] U.S. Cl.............. 117/201, 117/63, 117/119.6, 117/119.8, 260/707
[51] Int. Cl............................ B44d 1/48, B44c 1/18
[58] Field of Search............. 117/201, 119.6, 119.8, 117/63; 260/707

[56] References Cited
UNITED STATES PATENTS
3,182,098    5/1965    Van Wijk............................ 260/707
FOREIGN PATENTS OR APPLICATIONS
124,907    11/1967    Czechoslovakia.................. 117/201
OTHER PUBLICATIONS
Tsedrik et al., Effect of Triglycine Fluoroberyllate ... field, Chem. Abstracts, Volume 75, No. 134426(a), (Pg. 329-330), 1971.
Kuapil, Growing Single Crystal Ferroelectric Compounds of Glycine, e.g. Triglycine Sulfate, Chem. Abstracts, No. 39566p (1968), pg. 3709, Vol. 69.
Varikash, Diffusion of Triglycine Sulfate in concentrated Aq. Sol., Chem. Abstracts, Vol. 69, No. 99998r, pg. 9380, (1968).

Primary Examiner—Alfred L. Leavitt
Assistant Examiner—M. F. Esposito
Attorney—G. H. Bruestle

[57]    ABSTRACT

A mixture of two volatile solvent liquids and a particulate material is prepared, applied to a substrate and the liquids are evaporated from the mixture to form a film of the material on the substrate. One of the liquids has higher volatility but is a relatively poorer solvent for the material than the other liquid. Evaporation of the liquids may be followed by densification steps wherein a vaporized solvent is applied to the film and then evaporated.

17 Claims, No Drawings

METHOD FOR FABRICATION OF POLYCRYSTALLINE FILMS

BACKGROUND OF THE INVENTION

This invention relates to a process for depositing a film of material on a substrate and more particularly to a process utilizing two volatile solvent liquids to form a mixture with the material to be deposited.

In the development of infrared radiation detectors, studies have been made in search of various materials that may be used for such detectors. The object of one of these studies was to determine whether useful pyroelectric materials such as triglycine sulfate (TGS), triglycine selenate (TGSe) and triglycine fluoberyllate (TGFB) could be prepared in thin film form.

Thin films of many materials can be prepared by vacuum evaporation or sputtering techniques. However, TGS, TGSe and TGFB are delicate organic compounds that thermally decompose before they melt or exhibit appreciable vapor pressure. For example, TGS melts with decomposition at about 223°C, whereas TGSe decomposes at about 150°C. Therefore, since such decomposition precludes the use of evaporation techniques and makes sputtering unattractive, there is a need for yet another method of depositing a pyroelectric material on a substrate.

In attempts to deposit pyroelectric films by solvent evaporation from a saturated aqueous solution, it was discovered that these pyroelectric materials formed relatively large (i.e., several millimeter) needle-like crystals on an otherwise bare substrate. Because of the gross non-uniformity of these layers, such a method of film deposition was found to be unsatisfactory.

Another method was suggested in U.S. Pat. No. 3,511,991 issued to H. P. Beerman. An essential step in this method, however, requires the use of a plastic binder to hold microcrystals of the pyroelectric material together. Unfortunately, the use of such binders or other additives may have an adverse effect on the properties of the resultant film and therefore also is undesirable.

SUMMARY OF THE INVENTION

In view of the disadvantages of the foregoing methods, a process has been found that produces a relatively dense polycrystalline film on a substrate without the use of any binders or other additives. Instead, the films are held together and bonded to the substrate by the film material itself.

A mixture of two volatile solvent liquids and particulate material is prepared and applied to a substrate. The liquids are selected so that one has a higher volatility than the other but is a poorer solvent for the particulate material used. Subsequent evaporation of the liquid having higher volatility produces a film having an intergrain space which is primarily filled with the second, lower volatility, liquid. Following evaporation of the lower volatility liquid, the film may be further densified by the addition of controlled quantities of a saturated vaporized solvent, and subsequent evaporation of said solvent.

DETAILED DESCRIPTION

In a general embodiment of the present invention, two liquids are combined with a particulate material to form a mixture. The liquids are so selected that one liquid has higher volatility but is a poorer solvent for the particulate material than the other liquid. The major portion of the particulate material is held in suspension while a lesser portion is dissolved in the liquids. After formation, the mixture is applied to a substrate and the liquids are evaporated. Because one liquid has higher volatility than the other, this liquid evaporates at a faster rate than does the lower volatility liquid. If the volatilities of the two liquids differ sufficiently, the higher volatility liquid will completely evaporate while only a small percentage of the lower volatility liquid evaporates. During evaporation of the higher volatility liquid, the suspended particulate material in the mixture gradually settles onto the substrate thereby building up a film. Meanwhile, a portion of the material that was dissolved in the higher volatility liquid remains in a solution and adds to the material concentration in the lower volatility liquid.

At the point of complete evaporation of the higher volatility liquid, it is highly desirable to have a sufficient amount of the lower volatility liquid left to thoroughly saturate the deposited film so that the inner gaps in the polycrystalline structure of the film contain the lower volatility liquid having highly concentrated proportions of the material dissolved therein. Subsequent evaporation of this lower volatility liquid, therefore results in deposition of the dissolved material within the polycrystalline gaps, thereby increasing the density of the deposited film.

By appropriate calculation or by experimentation, it is possible to determine the proportions of the two liquids and the particulate material. Generally, it is desirable to hold the ratio of the lower volatility liquid to particulate matter to within defined limits. The ideal value for this ratio occurs when the deposited film is adequately saturated with the lower volatility liquid after the higher volatility liquid is evaporated. The upper limit of this same ratio is set to keep the lower volatility liquid from completely dissolving the deposited film after the high volatility liquid has evaporated.

The ratio of particulate material to total liquid also can be varied and will generally be determined by the procedure with which the mixture is applied to the substrate. For example, the texture of the mixture can be varied from a liquid to a thick paste to suit the method of application to the substrate and/or the thickness of film desired.

In order to increase the density of the resultant film, the general embodiment may include one or more densification steps. Essentially, density of the film may be increased by dissolving portions on the surface of the film and redepositing the dissolved portions within the gaps of the polycrystalline structure.

Many variations are possible from the foregoing general embodiment without departing from the scope of the present invention. Following are three specific embodiments which will serve as examples in further describing the aspects of the present invention.

In a preferred embodiment, first a mixture of an alcohol, water and a particulate pyroelectric material is prepared. The mixture is then ball milled until the pyroelectric material is submicron size and a relatively stable suspension is obtained. It has been found that ball milling for a period of approximately 300 hours is required to obtain the reduced size and suspension stability desired. Following the milling operation, the mixture is placed in a container having a substrate positioned on its bottom. The container is then set aside and the liquid evaporated. As the alcohol evaporates, a portion of the pyroelectric material settles onto the substrate while a percentage of water increases in the remaining liquid. Thereafter, the water also is evaporated leaving a thin film of the pyroelectric material on the substrate.

Although any pyroelectric material may be used with the preceeding embodiment, preferably, triglycine sulfate (TGS), triglycine selenate (TGSe), triglycine fluoberyllate (TGFB) or combinations of these or analogous pyroelectric compounds are utilized. Similarly, several different alcohols including isopropyl alcohol, methyl alcohol or higher molecular weight alcohols such as isobutyl alcohol may be used. Typical mixtures which have proven effective are given in the following table.

|  | TGS Films | TGSe Films |
|---|---|---|
| Isopropyl alcohol | 20cc | 20cc |
| Water | 20mg | 20mg |
| Proelectric | 131mg | 144mg |

A suitable TGS is manufactured by Eastman Organic Chemicals and is identified as Item No. 9921, Glycine Sulfate. A suitable TGSe is manufactured by BDH Chemicals, Ltd. and is identified as Code No. 47060, "Optran" Triglycine Selenate.

The thickness of the deposited film, when uniformly deposited at bulk density, theoretically would be about 10$\mu$m if the substrate were covered with a 100 ml depth of one of the above mixtures. However, it was found experimentally that a mixture depth of 25 mils produced at 10$\mu$m film of TGS thus indicating that the deposited film was about one fourth the bulk density of TGS.

Since it is desirable to have film density approach bulk density, thereby increasing the strength of the intergrain bonds and increasing the adherence of the film on the substrate, an additional densification step may be used to further concentrate the film. Such densification is not only important for added mechanical strength, but also results in films that exhibit properties more nearly equal to that of bulk. An effective densification procedure is to treat the dry film with saturated water vapor at a temperature approaching the boiling point of water. The water vapor dissolves a portion of the surface of the film and permeates the porous film. Next, the film is dried, whereupon, the dissolved portion of the pyroelectric material is redeposited within the internal gaps in the porous film. The densification procedure may be repeated several times if necessary, however, a significant densification occurs on the first treatment. For example, it has been found experimentally that one treatment with water vapor can increase the density of a deposited TGS film by a factor of about 2.5 (e.g., to a density of 80 percent bulk). Because of this densification step, an increase in output voltage by a factor of about 100 was noted when the film is used as an infrared detector.

In another embodiment of the invention, the pyroelectric material is dry ball milled before it is mixed with an alcohol and water. After the material is dry ball milled to submicron size, just enough alcohol and water are added to the material to form a paste. The paste is then applied directly to the substrate, such as by use of a doctor blade, and the alcohol and water are evaporated to form a pyroelectric film on the substrate. The film can then be densified as previously discussed.

This embodiment is particularly suitable for use with TGSe because of the difficulty that may be encountered with keeping TGSe in a stable suspension. It should be noted, however, that the second embodiment may result in a film having greater variation in thickness and texture than is obtainable with the preferred embodiment. The resultant films, as prepared by the second embodiment, are adequate for some functions but may not possess the uniformity desired for other functions.

In a third specific embodiment, the pyroelectric material is mixed with a small amount of liquid during ball milling and then diluted to the desired concentration following milling. This embodiment has the advantage of increasing the yield of suspension from the rather time consuming milling procedure. After dilution, the same application, evaporation, and densification steps are carried out as in the preferred embodiment.

In any one of the preceding three embodiments, the application, evaporating and densifying steps may be repeated sequentially one or more times in order to obtain a desired thickness of film. Experimentation has shown that such multi-layer build-up of the film produces relatively defect free layers since any defects, such as holes and cracks, are repaired by the deposition of subsequent layers.

The film deposited by any one of the foregoing embodiments can be delinated into individual detectors by masking with some appropriate means (e.g., photoresist) whereafter the unwanted portions are etched away. A suitable etchant for triglycine sulfate is manufactured by Transcene Co., Inc. under the brand name Buffer HF.

I claim:

1. A process for depositing a polycrystalline film on a substrate which comprises:
preparing a mixture of two volatile solvent liquids having a particulate pyroelectric material suspended therein, one of said volatile solvent liquids having higher volatility and in which said particulate material has lower solubility than the other liquid;
applying said mixture to said substrate; and
evaporating said liquids to form a film of said material on said substrate.

2. The process as defined in claim 1, including densifying said film following evaporation of said liquids.

3. The process as defined in claim 2, wherein said densifying comprises, treating said film with a vaporized solvent for said material to permeate said film, and drying said permeated film.

4. The process as defined in claim 3, wherein said vaporized solvent is saturated water vapor at a temperature approaching the boiling point of water.

5. The process as defined in claim 3, including repeating said applying, evaporating, treating and drying steps at least once.

6. The process as defined in claim 1, wherein said preparing a mixture includes, milling said mixture to reduce said particulate material to submicron size.

7. The process as defined in claim 6, wherein said milling is performed by ball milling said mixture.

8. The process as defined in claim 1, wherein said preparing a mixture includes, dry milling said particulate material to submicron size prior to addition of said liquids.

9. The process as defined in claim 8, wherein said dry milling is performed by dry ball milling said material.

10. The process as defined in claim 1, wherein said preparing a mixture includes, forming a combination of said particulate material and portions of said volatile solvent liquids, milling said combination, and adding the remaining portions of said volatile solvent liquids to obtain a predetermined concentration of said particulate material in said volatile solvent liquids.

11. The process as defined in claim 1, wherein one of said volatile solvent liquids is water.

12. The process as defined in claim 1, wherein one of said volatile solvent liquids is an alcohol.

13. The process as defined in claim 1, wherein said pyroelectric material is a material selected from the group consisting of triglycine sulfate, triglycine selenate, triglycine fluoberyllate and combinations thereof.

14. A process for depositing a polycrystalline film on a substrate which comprises:
preparing a mixture of water and an alcohol having a particulate pyroelectric material suspended therein;
applying said mixture to said substrate;
evaporating said alcohol from said mixture thereby concentrating said pyroelectric material in said water and forming a film of pyroelectric material on said substrate;
evaporating said water to deposit portions of said pyroelectric material within said film;
treating said film of pyroelectric material with saturated water vapor at a temperature approaching the boiling point of water; and
drying said permeated film of pyroelectric material.

15. The process as defined in claim 14, including ball milling said mixture to reduce said pyroelectric material to submicron size.

16. The process as defined in claim 14, including repeating said applying, evaporating said alcohol, evaporating said water, treating and drying steps at least once.

17. The process as defined in claim 14, wherein said pyroelectric material is a material selected from the group consisting of triglycine sulfate, triglycine selenate, triglycine fluoberyllate and combinations thereof.

* * * * *